United States Patent
Minari et al.

(10) Patent No.: US 9,407,124 B2
(45) Date of Patent: Aug. 2, 2016

(54) MOTOR FRAME WITH HANGING FEATURES AND BOLTS

(71) Applicant: Sumitomo Heavy Industries, Ltd., Tokyo (JP)

(72) Inventors: Takahiro Minari, Aichi (JP); Masato Ikegami, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 150 days.

(21) Appl. No.: 14/206,426

(22) Filed: Mar. 12, 2014

(65) Prior Publication Data

US 2014/0265691 A1 Sep. 18, 2014

(30) Foreign Application Priority Data

Mar. 12, 2013 (JP) .................................. 2013-049480

(51) Int. Cl.
 *H02K 5/22* (2006.01)
(52) U.S. Cl.
 CPC . *H02K 5/22* (2013.01); *H02K 5/225* (2013.01)
(58) Field of Classification Search
 CPC ........... H02K 5/22; H02K 5/04; H02K 5/225; H02K 5/26
 USPC .............. 310/91, 89, 418, 419, 428, 431, 433
 See application file for complete search history.

(56) References Cited

U.S. PATENT DOCUMENTS

| | | | | |
|---|---|---|---|---|
| 5,008,575 A | * | 4/1991 | Ishimoto | B66C 1/62 310/64 |
| 5,630,461 A | * | 5/1997 | CoChimin | B22C 9/046 164/34 |
| 5,752,688 A | * | 5/1998 | Campbell | H02K 5/26 248/672 |
| 6,422,527 B1 | * | 7/2002 | Lees | F16M 7/00 248/672 |
| 2010/0172770 A1 | * | 7/2010 | Ichise | F04B 35/04 417/366 |
| 2010/0172772 A1 | * | 7/2010 | Watanabe | F04B 27/0895 417/410.1 |
| 2010/0284838 A1 | * | 11/2010 | Ichise | F04B 35/04 417/410.1 |

FOREIGN PATENT DOCUMENTS

| | | |
|---|---|---|
| CN | 202178652 U | 3/2012 |
| CN | 102403823 A | 4/2012 |
| DE | 3823350 A1 | 1/1990 |
| DE | 102008028607 A1 | 12/2009 |
| DE | 102008028622 A1 | 12/2009 |
| DE | 102009010718 A1 | 9/2010 |
| GB | 2334827 A | 9/1999 |
| JP | S63-131566 A | 6/1988 |
| JP | 2002-505569 A | 2/2002 |
| JP | 2007-082362 A | 3/2007 |

* cited by examiner

*Primary Examiner* — Naishadh Desai
(74) *Attorney, Agent, or Firm* — Michael Best & Friedrich LLP

(57) ABSTRACT

A motor frame comprising four side surfaces, built-up portions and leg members is provided. The four side surfaces define the outer circumference of the motor frame. The four side surfaces include a terminal box mounting surface on which a terminal box is provided and two side surfaces located on respective sides of the terminal box mounting surface. The built-up portions are provided on each of the two side surfaces, wherein two or more bolt holes can be formed on the built-up portions. The built-up portions are configured such that any of hanging bolts or the leg members can be fastened to the built-up portions. The hanging bolts are screwed into bolt holes formed on one of the two side surfaces and the leg members are fastened to bolt holes formed on the other of the two side surfaces.

10 Claims, 5 Drawing Sheets

MOTOR FRAME WITH HANGING FEATURES AND BOLTS

BACKGROUND OF THE INVENTION

1. Field of the Invention

The present invention relates to a structure of a motor frame.

2. Description of the Related Art

The motor frame of a motor need be provided with a bolt hole into which a hanging bolt used to hoist the motor by a wire is screwed. In order to install a motor on a floor surface, a leg member should be welded to the motor frame (see Japanese Utility Model Publication 63-131566).

SUMMARY OF THE INVENTION

One embodiment of the present invention relates to a motor frame comprising:

four side surfaces defining the outer circumference of the motor frame, the four side surfaces including a terminal box mounting surface on which a terminal box is provided and two side surfaces located on respective sides of the terminal box mounting surface;

built-up portions provided on each of the two side surfaces, wherein two or more bolt holes can be formed on the built-up portions; and leg members, wherein the built-up portions are configured such that any of hanging bolts or the leg members can be fastened to the built-up portions, and wherein the hanging bolts are screwed into bolt holes formed on one of the two side surfaces and the leg members are fastened to bolt holes formed on the other of the two side surfaces.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

In case that a terminal box is attached to a motor frame, a leg member should be welded to the motor frame to adapt to the orientation of the terminal box. It takes a considerable time to weld a leg member to the motor frame.

Some embodiments according to the present invention provides a technology capable of adapting to a plurality of orientations of a terminal box and ensuring that a motor frame can be hoisted and installed easily.

According to the embodiments, the motor frame can be hoisted in a stable manner irrespective of whether the terminal box faces rightward or leftward. Further, the motor frame can be installed on the floor surface easily with the terminal box facing rightward or leftward.

Figure 1:
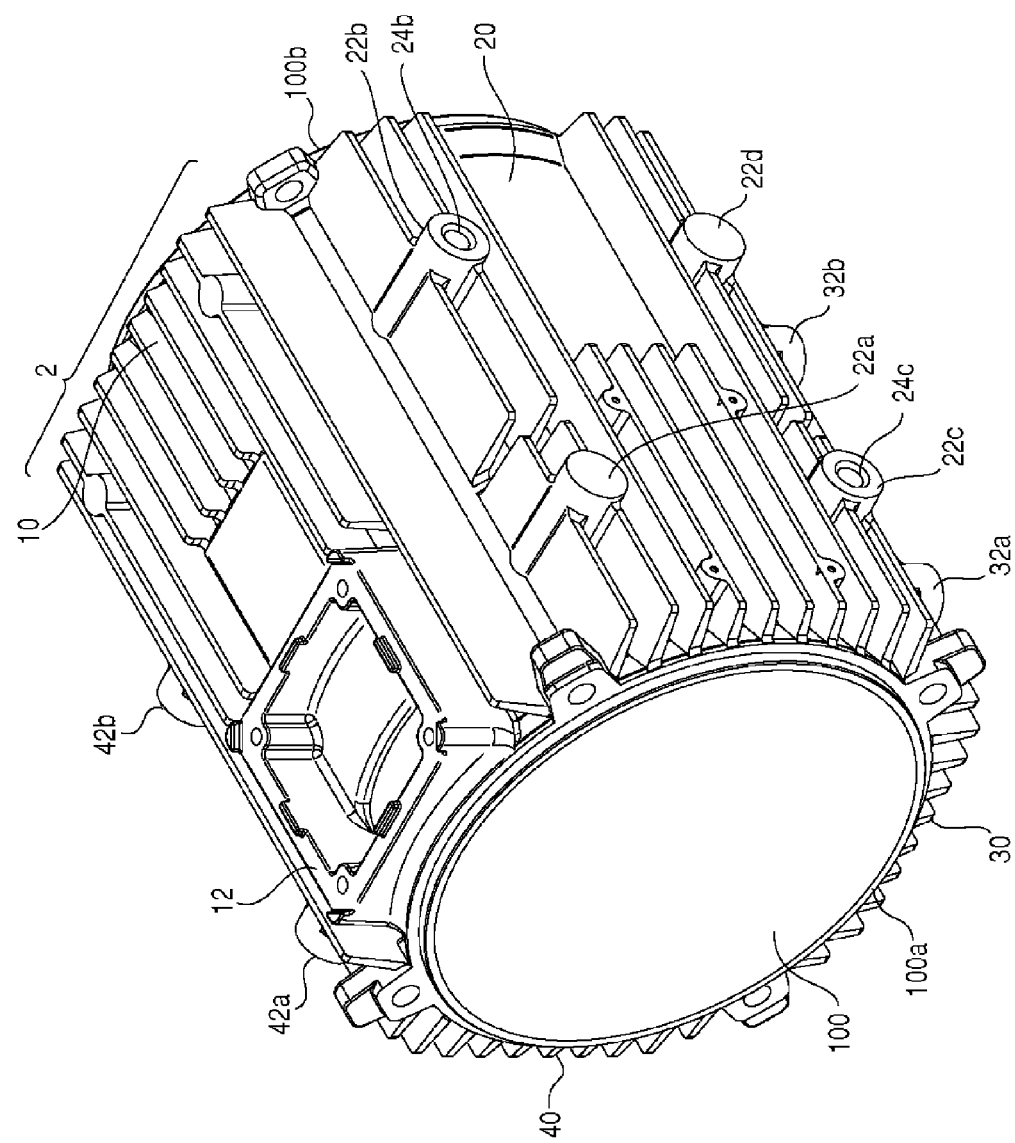
FIG. 1 is a perspective view of a motor frame according to an embodiment of the present invention.

FIG. 1 is a perspective view of a motor frame 100 according to an embodiment of the present invention. The motor frame 100 of a squirrel-cage induction motor is shown. However, the motor frame 100 may be a frame of any other type of motor.

The motor frame 100 is made of, for example, die-cast aluminum, cast iron, or a steel plate. The motor frame 100 has the role of supporting the weight of a rotor and a stator constituting the motor and radiating heat generated in the rotor, stator, etc. outside the motor.

The inner circumferential surface of the motor frame 100 is formed to be cylindrical. A stator core (not shown) formed by laminating magnetic steel sheets is fitted to the inner circumferential surface by, for example, shrink fitting. A cover (not shown) extending from the outer circumference of the frame toward the inner diameter is attached to ends 100a and 100b of the motor frame 100. A bearing is fitted to a bearing mount formed in the inner circumference of each cover. The rotor (not shown) is supported via the bearings so as to be rotatable with respect to the stator. The cover and the motor frame 100 may be formed to be integral with each other.

For the purpose of improving heat radiance performance, a large number of planar heat radiation fins 2 are provided on the outer circumferential surface of the cylindrical frame. By aligning the orientation and height of the plurality of fins, the ridge lines of the fins as connected form four substantially square surfaces as viewed from the side of the rear end 100b of the motor frame 100. In one of these surfaces 10 is formed a seat 12 in which a terminal box for connecting terminals of the stator to external wirings is provided. In the following description, the surface formed with the seat 12 in which the terminal box is provided will be referred to as "terminal box mounting surface 10". For convenience, the surface located to the right of the terminal box mounting surface 10 will be referred to as a right side surface 20, the surface located to the left of the terminal box mounting surface 10 will be referred to as a left side surface 40, and the surface opposite to the terminal box mounting surface 10 will be referred to as a surface 30 opposite to the terminal box mounting surface, as viewed from the side of the front end 100a of the motor frame.

Of the four surfaces 10, 20, 30, and 40 of the motor frame 100, the right side surface 20 and the left side surface 40 on the respective side of the terminal box mounting surface 10 are provided with at least two built-up portions that can be worked and formed with bolt holes. In the example of FIG. 1, the right side surface 20 is provided with four built-up portions 22a-22d and the left side surface 40 is also provided with four built-up portions 42a-42d (see FIG. 2). In this embodiment, the built-up portions 22a-22d and the built-up portions 42a-42d are located to be symmetrical to each other with respect to a plane through the axial center of the motor frame and perpendicular to the terminal box mounting surface 10. The surface 30 opposite to the terminal box mounting surface is also provided with four built-up portions 32a-32d (see FIGS. 2 and 3).

Of the four built-up portions of the right side surface 20, bolt holes 24b and 24c are preformed in the built-up portions 22b and 22c, respectively. Similarly, bolt holes are preformed in the built-up portions 42b and 42c in symmetry with the built-up portions 22b and 22c, respectively, with respect to the plane through the axial center of the motor frame and perpendicular to the terminal box mounting surface 10. The bolt holes may be preformed before assembling the motor or after assembling the motor. In other words, the term "preform" means that the bolt holes are formed before the motor frame 100 is shipped to a site of motor installation.

The motor frame 100 may be installed such that the seat 12 in which the terminal box is provided faces upward, rightward, or leftward, depending on the wiring or layout space. By forming two bolt holes respectively in the right side surface 20 and the left side surface 40 sandwiching the terminal box mounting surface 10, the motor frame 100 can be hoisted irrespective of whether the terminal box faces upward, rightward, or leftward.

Figure 2:
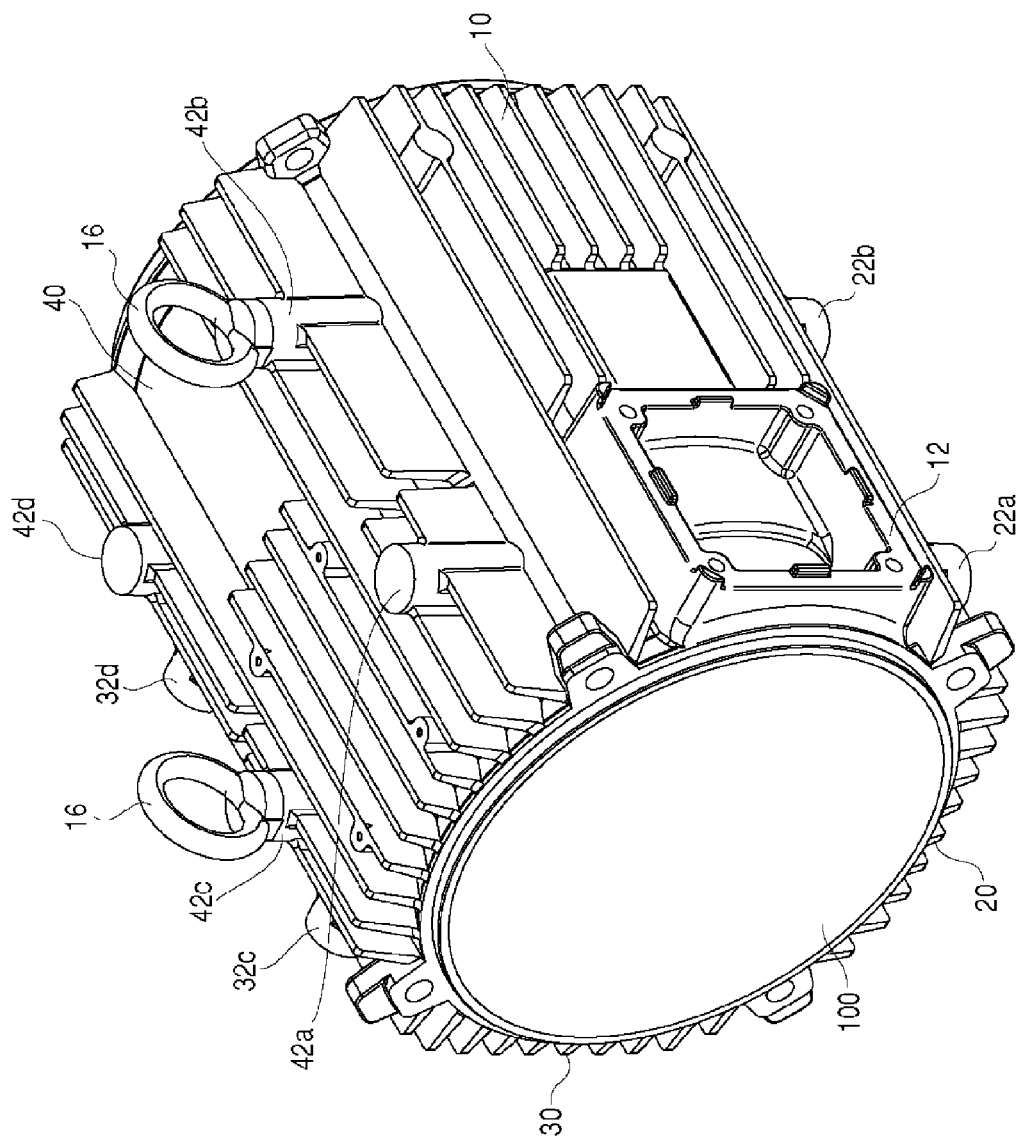
FIG. 2 is a perspective view of a motor frame in which a hanging bolt is fastened.

For example, if the seat 12 in which the terminal box is provided faces rightward, hanging bolts 16 may be screwed into the bolt holes formed in the built-up portions 42b and 42c on the left side surface 40, as shown in FIG. 2, and the wires may be connected to these bolt holes. If the seat 12 in which the terminal box is provided faces leftward, hanging bolts may be screwed into the bolt holes formed in the built-up portions 22b and 22c on the right side surface 20.

If the motor is hoisted such that the seat 12 in which the terminal box is provided faces upward, hanging bolts may be screwed into the bolt holes formed in the built-up portion 22b on the right side surface 20 and the built-up portion 42c on the left side surface 40 or to the bolt holes formed in the built-up portion 22c on the right side surface 20 and the built-up portion 42b on the left side surface 40, and the wires may be connected accordingly. By screwing hanging bolts into the built-up portions at non-symmetrical positions on the left and right side surfaces, the motor frame 100 can be hoisted such that the axis of the motor frame is not tilted front to back and the motor frame can be hoisted substantially parallel to the floor surface.

Preferably, the built-up portions are formed such that the upper surfaces of all built-up portions (surfaces where bolt holes are formed) formed on a given surface are flush. In this way, the motor frame can be hoisted with the hanging bolts being fastened to the built-up portions on the left side surface or the right side surface such that the axis of the motor frame is not tilted front to back and the motor frame can be hoisted substantially parallel to the floor surface.

Provided that two or more bolt holes each can be formed by working the right side surface 20 and the left side surface 40, the side surfaces may be provided with only one built-up portion each. For example, an elongated built-up portion extending the direction of motor axis may be formed in the center of the right side surface 20 and/or the left side surface 40 so that two bolt holes may be formed in the built-up portion at a certain interval in the axial direction. In this case, too, the motor frame can be hoisted such that the terminal box faces leftward or rightward, by screwing hanger bolts into the two bolt holes on the right side surface or the left side surface. By screwing hanging bolts into bolt holes at non-symmetrical positions on the left and right side surfaces, the motor frame can be hoisted such that the terminal box faces upward.

The motor may be installed on the floor surface with a leg member attached to the motor frame 100. By forming four built-up portions on the surface 30 opposite to the terminal box mounting surface as well as well as on the right side surface 20 and the left side surface 40, the motor frame can be installed on the floor surface with a leg member attached to the motor frame, irrespective of whether the terminal box faces upward, rightward, or leftward. There is no need to preform a bolt hole in the built-up portions on the surface 30 opposite to the terminal box mounting surface. This is because the motor frame is not normally hoisted by screwing hanging bolts into the built-up portions on the surface 30 opposite to the terminal box mounting surface and bolt holes are not necessarily on the surface 30 unless leg members are attached.

Figure 3:
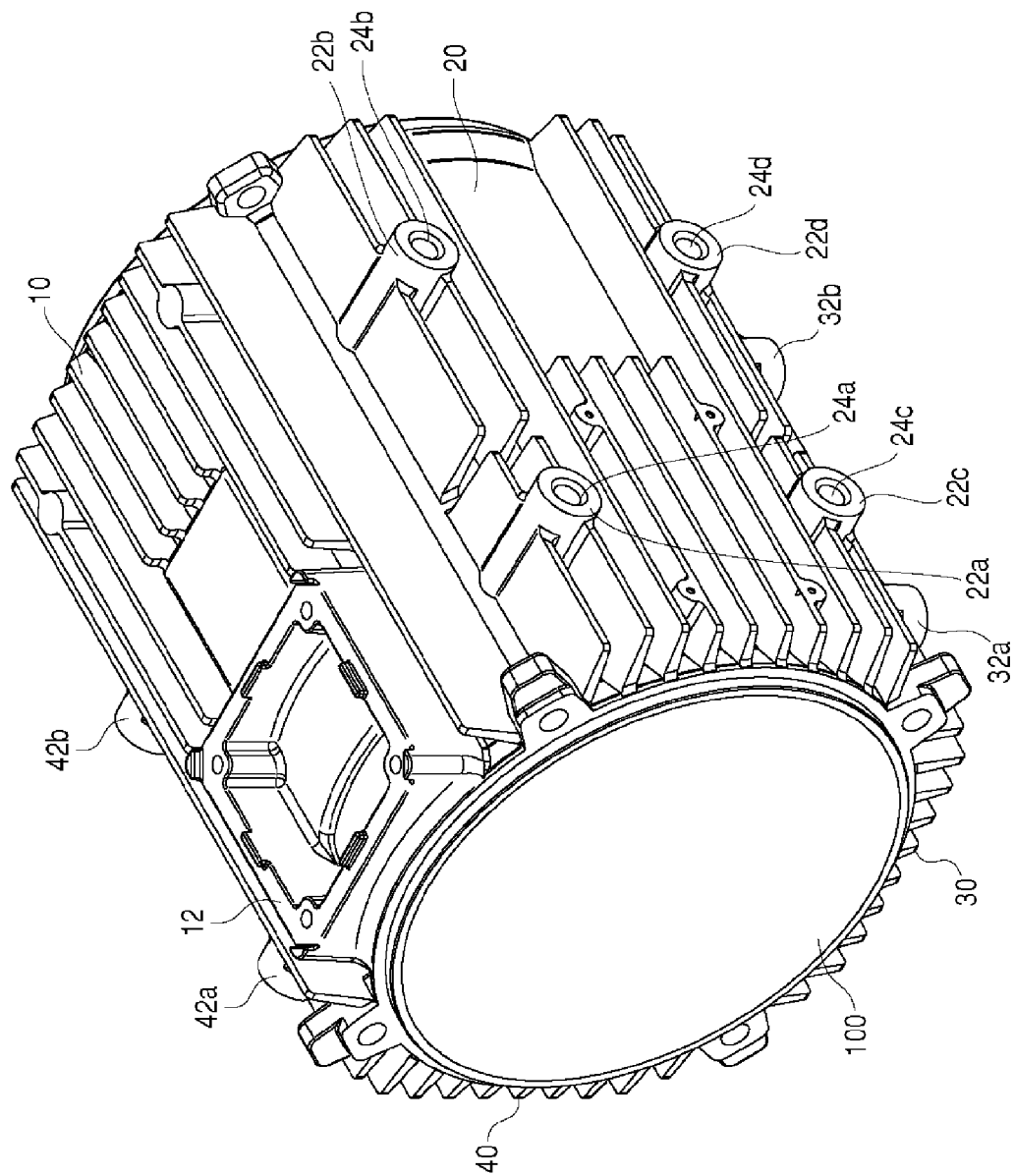
FIG. 3 is a perspective view of a motor frame formed with bolt holes in four built-up portions.

FIG. 3 shows that bolt holes 24a and 24d are additionally formed in the built-up portions 22a and 22d on the right side surface 20 of the motor frame 100 in addition to the built-up portions 22b and 22c preformed with bolt holes.

Figure 4:
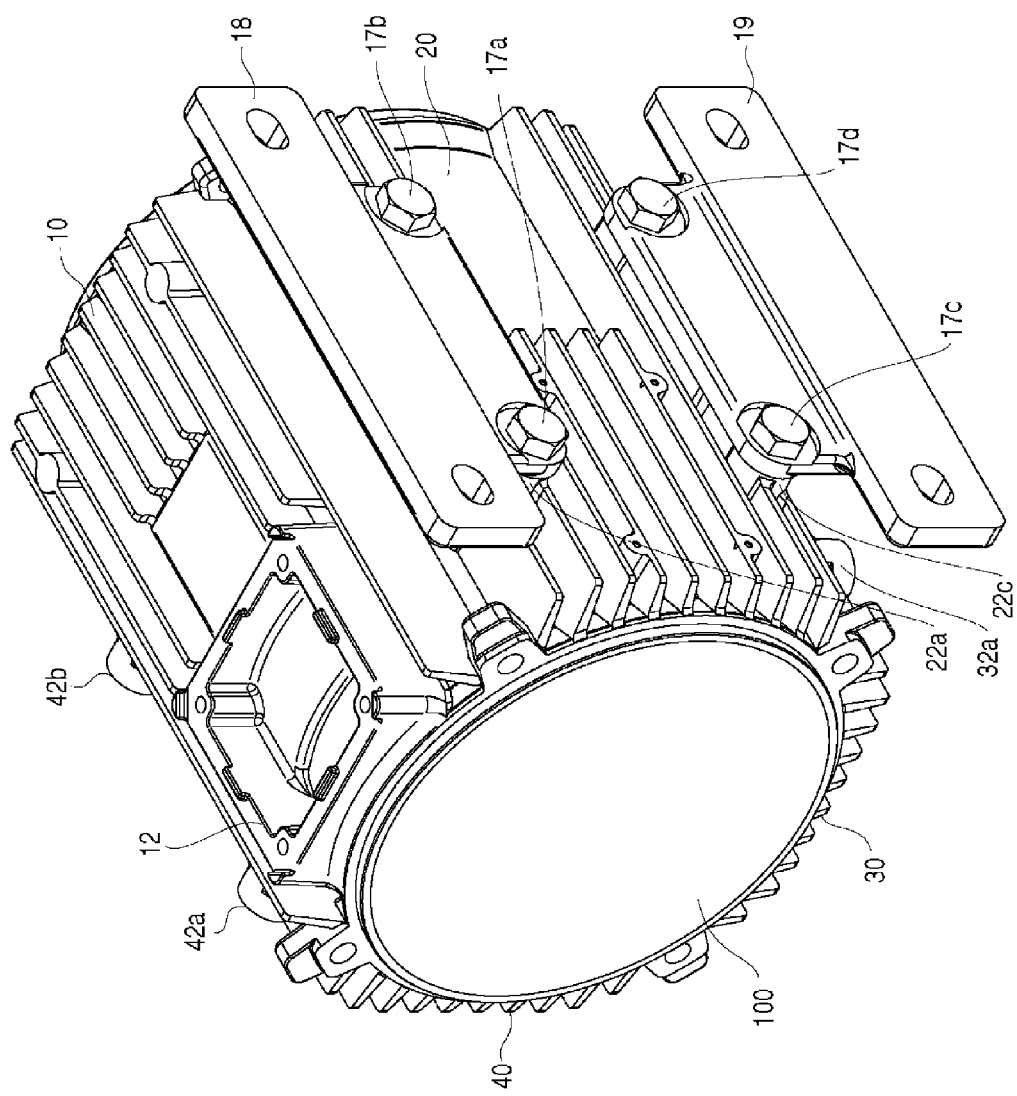
FIG. 4 is a perspective view of a motor frame to which leg members are fastened.
Figure 5:
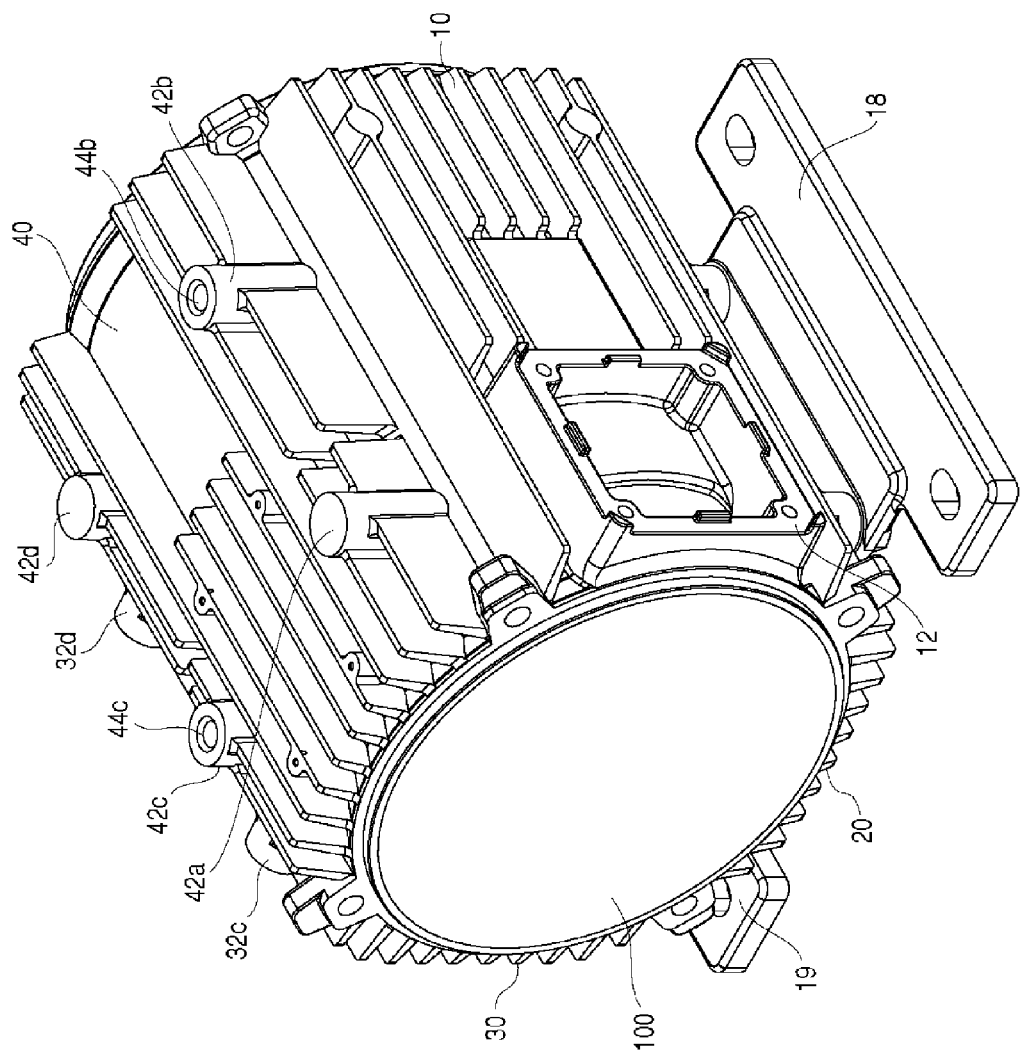
FIG. 5 is a perspective view of a motor frame to which leg members are fastened.

As shown in FIG. 4, a pair of leg members 18 and 19 are fastened by bolts 17a-17d, using the four bolt holes 24a-24d. The leg members 18 and 19 can be fastened while the motor frame is hoisted by screwing hanger bolts into the bolt holes preformed on the left side surface 40. As shown in FIG. 5, the motor frame 100 can be ultimately installed on the floor surface with the seat 12 in which the terminal box is provided facing rightward. Similarly, bolt holes may be additionally formed in the built-up portions 42a and 42d on the left side surface 40 of the motor frame 100 in addition to the built-up portions 42b and 42c preformed with bolt holes. The motor frame can be installed with the seat 12 in which the terminal box is provided facing leftward, by fastening a pair of leg members 18 and 19 to the total of four bolt holes.

To install the motor frame on the floor with the terminal box facing upward, bolt holes are additionally formed in the four built-up portions 32a-32d on the surface 30 opposite to the terminal box mounting surface. Subsequently, a pair of leg members are fastened using the four bolt holes on the surface 30 opposite to the terminal box mounting surface, while hanging bolts are screwed into the bolt holes preformed in the built-up portions 22b and 22c on the right side surface 20 and the bolt holes preformed in the built-up portions 42b and 42c on the left side surface 40 and while the motor frame is hoisted by wires. The leg members may be fastened before hoisting the motor frame.

To attach leg members on the surface 30 opposite to the terminal box mounting surface, it is preferable as described above that built-up portions 22a-22d and 42a-42d be formed at least at positions corresponding to the four vertices of the rectangle on each of the right and left side surfaces 20 and 40. Of the built-up portions 22a, 22b and 42a, 42b located on the rectangular side extending in the direction of motor axis and closer to the terminal box than the opposite side, bolt holes are preferably formed in the built-up portions 22b and 42b, which are more distanced from the terminal box than the built-up portions 22a and 42a, respectively. This is because, if bolt holes are formed in the built-up portions 22a and 42a closer to the terminal box, the wires may interfere with the terminal box as the motor frame is hoisted by the wires with the hanging bolts screwed into those bolt holes.

As described above, according to the embodiment, bolt holes smaller in number (e.g., two) than the number of bolt holes (e.g., four) required to fasten leg members are preformed (e.g., formed before the motor is assembled) on the side surfaces located on both sides of the terminal box mounting surface. In this way, the motor frame can be hoisted such that the terminal box faces upward, rightward, or leftward, depending on which bolt holes are used to screw hanging bolts. By reducing the number of bolt holes preformed in the motor frame, the time and load required for working the motor frame can be reduced.

By preforming built-up portions on the surface opposite to the terminal box mounting surface, and by additionally forming bolt holes in the built-up portions on the surface facing the floor, leg members can be attached and the motor frame can be installed on the floor accordingly, irrespective of whether the terminal box faces upward, rightward, or leftward.

Described above is an explanation based on an exemplary embodiment. The embodiment is intended to be illustrative only and it will be obvious to those skilled in the art that various modifications to constituting elements and processes could be developed and that such modifications are also within the scope of the present invention.

Priority is claimed to Japanese Patent Application No. 2013-049480, filed Mar. 12, 2013, the entire content of which is incorporated herein by reference.

What is claimed is:

1. A motor frame, comprising:
    a motor frame body; and
    a leg member that is a separate member from the motor frame body,
    wherein the motor frame body includes four side surfaces defining the outer circumference of the motor frame body,
    wherein the four side surfaces include a terminal box mounting surface on which a terminal box is provided, a first side surface, and a second side surface located on respective sides of the terminal box mounting surface,
    wherein the motor frame body includes first built-up portions, on which two or more bolt holes can be formed, provided on the first side surface and second built-up portions, on which two or more bolt holes can be formed, provided on the second side surface,
    wherein the first built-up portions are configured such that any of a hanging bolt or the leg member can be fastened to the first built-up portions,
    wherein the second built-up portions are configured such that any of the hanging bolt or the leg member can be fastened to the second built-up portions, and
    wherein the motor frame is configured to take a state in which the hanging bolt is fastened to the first built-up portions and the leg member is fastened to the second built-up portions, or a state in which the leg member is fastened to the first built-up portions and the hanging bolt is fastened to the second built-up portions.

2. The motor frame according to claim 1, wherein third built-up portions are provided on the surface opposite to the terminal box mounting surface.

3. The motor frame according to claim 1, wherein bolt holes smaller in number than the number of bolt holes required to fasten the leg member to the motor frame body are preformed on the first built-up portions and the second built-up portions.

4. The motor frame according to claim 2, wherein bolt holes are not preformed in the third built-up portions.

5. The motor frame according to claim 2,
    wherein, when the leg member is attached on the surface opposite to the terminal box mounting surface, built-up portions are provided at least at positions corresponding to the four vertices of a rectangle on each of the first and second side surfaces, and, of the those built-up portions located on a rectangular side extending in a direction of the motor axis and closer to the terminal box than the opposite side, bolt holes are formed in those built-up portions that are more distanced from the terminal box than the other built-up portions.

6. The motor frame according to claim 1, wherein surfaces of the first built-up portions provided on the first side surface and formed with bolt holes are flush with one another.

7. The motor frame according to claim 1, wherein the first and second built-up portions respectively include built-up portions provided at positions corresponding to the four vertices of a rectangle.

8. The motor frame according to claim 7, wherein first bolt holes are formed in two built-up portions, located on a diagonal, out of the four built-up portions of the first built-up portions.

9. The motor frame according to claim 8, wherein
    second bolt holes are formed in two built-up portions, located on a diagonal, out of the four built-up portions of the second built-up portions, and
    the two built-up portions in which first bolt holes are formed and the two built-up portions in which second bolt holes are formed are located to be symmetrical with respect to a plane through an axial center of the motor frame body and perpendicular to the terminal box mounting surface.

10. The motor frame according to claim 1, wherein the first built-up portions and the second built-up portions are located to be symmetrical with respect to a plane through an axial center of the motor frame body and perpendicular to the terminal box mounting surface.

* * * * *